(12) United States Patent
Leroy et al.

(10) Patent No.: US 9,669,816 B2
(45) Date of Patent: Jun. 6, 2017

(54) BRAKE BOOSTER SYSTEM

(71) Applicant: Ford Global Technologies, LLC, Dearborn, MI (US)

(72) Inventors: Tom Leroy, Dagenham (GB); Shane Keilthy, Coggeshall (GB); Mark Metcalfe, Hutton (GB)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/997,895

(22) Filed: Jan. 18, 2016

(65) Prior Publication Data
US 2016/0221561 A1 Aug. 4, 2016

(30) Foreign Application Priority Data

Feb. 3, 2015 (GB) .................................. 1501790.8

(51) Int. Cl.
| | | |
|---|---|---|
| B60T 13/72 | (2006.01) |
| B60T 8/171 | (2006.01) |
| B60T 13/52 | (2006.01) |
| B60T 17/02 | (2006.01) |
| B60T 17/22 | (2006.01) |

(52) U.S. Cl.
CPC ............. B60T 13/72 (2013.01); B60T 13/52 (2013.01); B60T 17/02 (2013.01); B60T 17/22 (2013.01); *B60T 2270/406* (2013.01)

(58) Field of Classification Search
CPC ........ B60T 13/72; B60T 13/52; B60T 18/171; B60T 17/02; B60T 17/22
USPC ........................................................... 701/48
See application file for complete search history.

(56) References Cited

U.S. PATENT DOCUMENTS

| | | | |
|---|---|---|---|
| 5,515,676 A * | 5/1996 | Earle ....................... | B60T 13/46 417/12 |
| 8,343,011 B2 | 1/2013 | Cunningham et al. | |
| 2012/0116656 A1 | 5/2012 | Martin et al. | |
| 2014/0137544 A1 | 5/2014 | Pursifull et al. | |
| 2015/0037172 A1* | 2/2015 | Liddington ............. | B60T 13/52 417/53 |
| 2015/0114348 A1* | 4/2015 | Pursifull .......... | F02M 35/10229 123/403 |

FOREIGN PATENT DOCUMENTS

| | | | |
|---|---|---|---|
| JP | 2005264874 | * | 9/2005 |
| JP | 2005264874 A | | 9/2005 |

OTHER PUBLICATIONS

EPO english translation of jp2005264874.*
Intellectual Property Office, Combined Search and Examination Report of GB1501790.8, Jul. 27, 2015, United Kingdom, 6 pages.

* cited by examiner

*Primary Examiner* — Yazan Soofi
(74) *Attorney, Agent, or Firm* — Greg Brown; McCoy Russell LLP

(57) ABSTRACT

Methods and systems are provided for detecting a fault within a brake booster system of a vehicle. In one example, a method may include measuring the pressure of a brake booster chamber and the pressure of an inlet manifold, comparing the booster chamber and inlet manifold pressures, determining the faulty source, and restricting the use of an electrical system in case of a fault. In this way, the pressure within the inlet manifold may be reduced or maintained in the event of a fault.

16 Claims, 4 Drawing Sheets

BRAKE BOOSTER SYSTEM

CROSS REFERENCE TO RELATED APPLICATION

The present application claims priority to Great Britain Patent Application No. 1501790.8, filed Feb. 3, 2015, the entire contents of which are hereby incorporated by reference for all purposes.

FIELD

The present description relates generally to methods and systems for controlling a brake booster for a vehicle engine to detect failure of a vacuum source and to protect a brake booster vacuum.

BACKGROUND/SUMMARY

Most modern vehicles may be fitted with a brake booster which utilizes a vacuum chamber to increase the braking force supplied from the brake pedal to the brake master cylinder. The brake booster prevents the brake pedal from feeling heavy to the driver.

The brake booster may require a source of vacuum pressure however in order to operate, which, in naturally aspirated engines, is often delivered exclusively by the inlet manifold of a vehicle. Under some circumstances, the vacuum supplied by the inlet manifold may be insufficient. This may be due to a large amount of torque being demanded from the engine, either for mechanical drive or to power auxiliary electrical systems of the vehicle. In this case, the inlet throttle may be fully open and thus, an inlet manifold vacuum may be low.

In order to maintain the brake booster vacuum under these conditions, an additional vacuum source must be used, such as a super aspirator. A super aspirator often takes the form of a venture duct connected between the intake duct and an inlet manifold across the inlet throttle. The pressure difference across the throttle drives a flow through the venture allowing for a lower pressure to be achieved within the venture. This may in turn be used to provide a lower pressure in the brake booster vacuum chamber compared to the inlet manifold pressure.

In some cases, sufficient pressure difference may not be available for a venture duct to operate effectively, and a separate pump may then be required to provide a vacuum source. Whatever form the vacuum source takes, a shut-off valve is often added which may be opened only when insufficient vacuum pressure is detected within the brake booster and/or inlet manifold. The shut-off valve is typically controlled by the engine's power-train control module and is normally in a closed position unless activated.

However, the inventors herein have recognized potential issues with such systems. As one example, in the case that the super aspirator itself or the electronic shut-off valve fails, sufficient vacuum pressure may not be available within the brake booster and the brake pedal may begin to feel heavy. A heavy brake pedal provides a less comfortable driving experience and may lead drivers to believe that braking performance may be impaired. Thus, it may be desirable to limit faults of this kind.

In one example, the issues described above may be addressed by a method for detecting a fault within a brake booster system of a vehicle, the vehicle comprising an inlet manifold for an engine, the inlet manifold providing a first source of vacuum for the brake booster system, the vehicle further comprising a second source of vacuum for the brake booster system, wherein the method comprises: measuring the presence of a brake booster chamber and the pressure in the inlet manifold when the secondary vacuum source is instructed to be active; comparing the measured brake booster chamber and inlet manifold pressures; and determining whether the secondary vacuum source is faulty. The method may further comprise restricting the use of a first electrical system which draws power from the engine in the case of a fault so as to reduce and/or maintain the pressure of the inlet manifold. In this way, it may be possible for the brake booster system of the present disclosure to maintain the pressure of the brake system such that a user such as the driver of a vehicle may not experience an unnecessarily heavy or difficult to engage brake pedal.

As one example, a method for detecting a fault within a brake booster system of a vehicle engine is provided. The engine may include an inlet manifold comprising a first source of vacuum and a second source of vacuum. The method for detecting a fault within the brake booster system may comprise measuring the pressure of a brake booster chamber and the pressure in the inlet manifold, comparing the measured brake booster chamber and inlet manifold pressures, determining whether the secondary source of vacuum is faulty, and restricting the use of an electrical system which may draw power from the engine in the case of a fault. In this way, it may be possible to reduce and/or maintain the pressure within the inlet manifold to fall within a desirable pressure range. This may further allow for the brake pedal of the vehicle to maintain its resistance with respect to the amount of pressure necessary for a user such as a driver to apply to the brake pedal.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
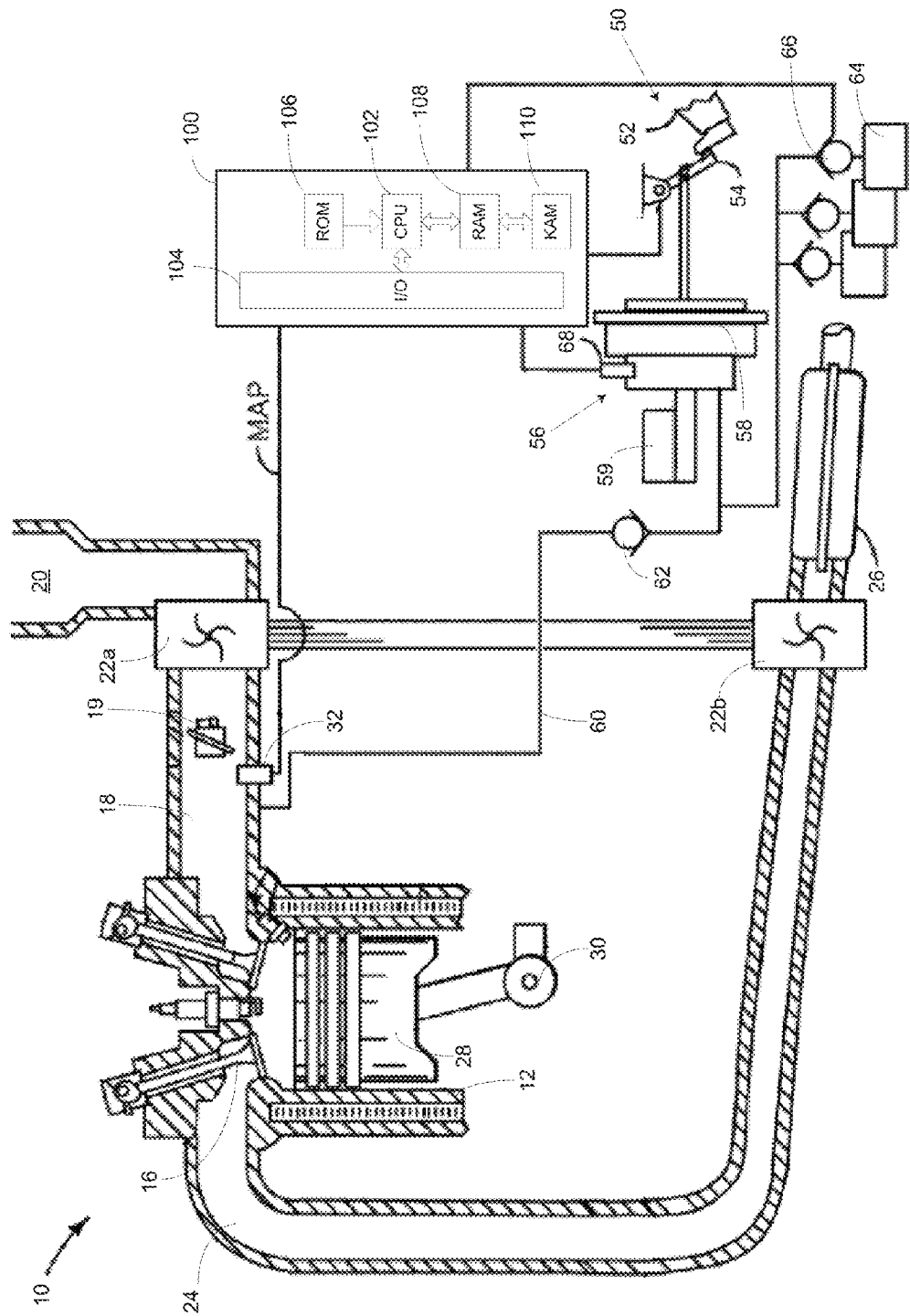
FIG. 1 is a schematic diagram of an engine, control system and brake system of a vehicle fitted with a brake booster system.

The following description relates to systems and methods for detecting and reporting a failure of a vacuum source of a brake booster system. A method is also provided to respond to and protect a brake booster vacuum. In FIG. 1, a schematic diagram of an engine is provided. The example embodiment provided includes a control system and brake system of a vehicle fitted with a brake booster system. An example brake booster assembly system is provided in FIG. 2. The example embodiment provided in FIG. 2 may comprise a naturally aspirated internal combustion engine, a control system, a brake booster system, and a brake system.

Figure 2:
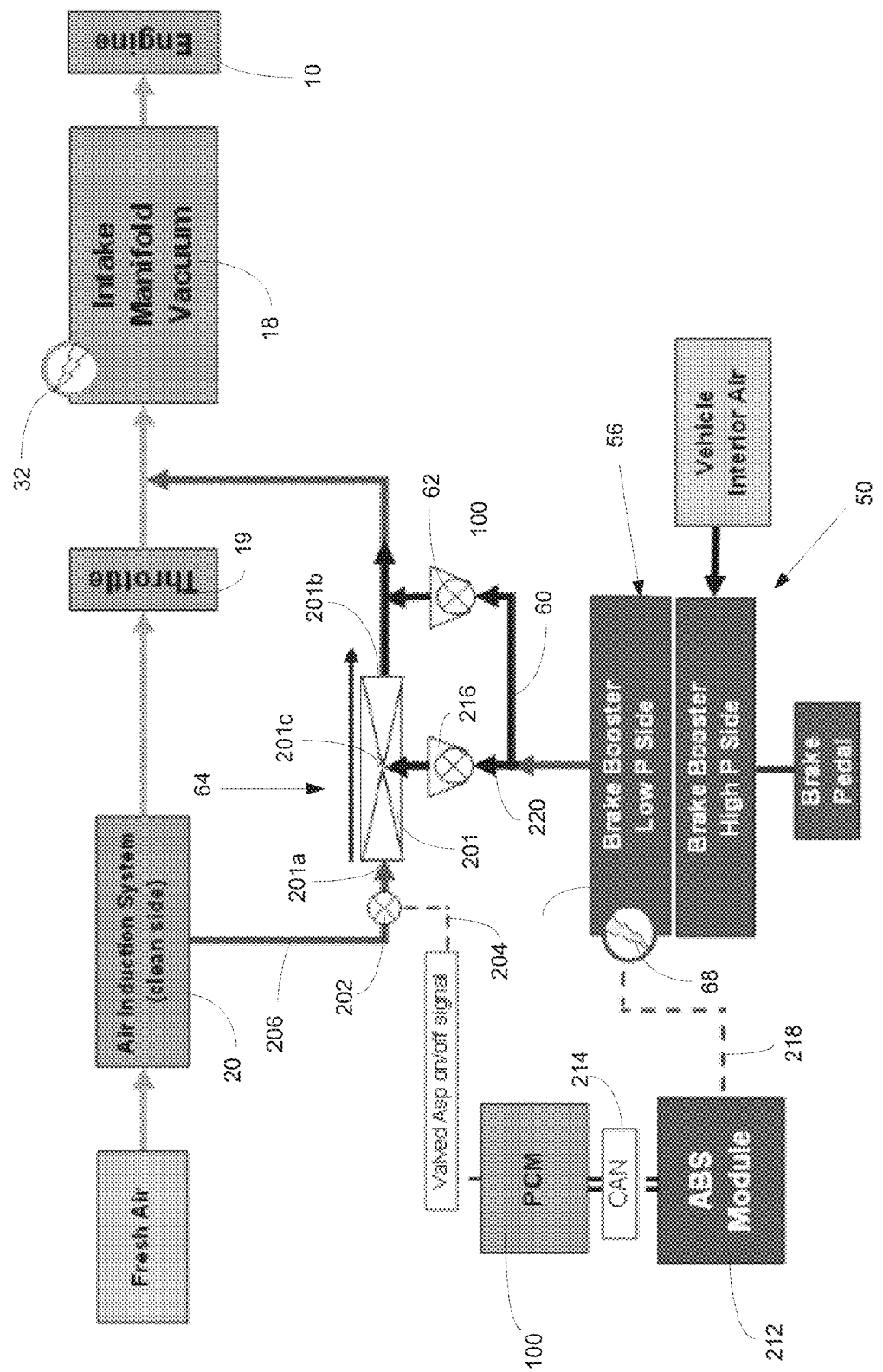
FIG. 2 is a schematic view of a brake booster assembly for a vehicle
Figure 3A:
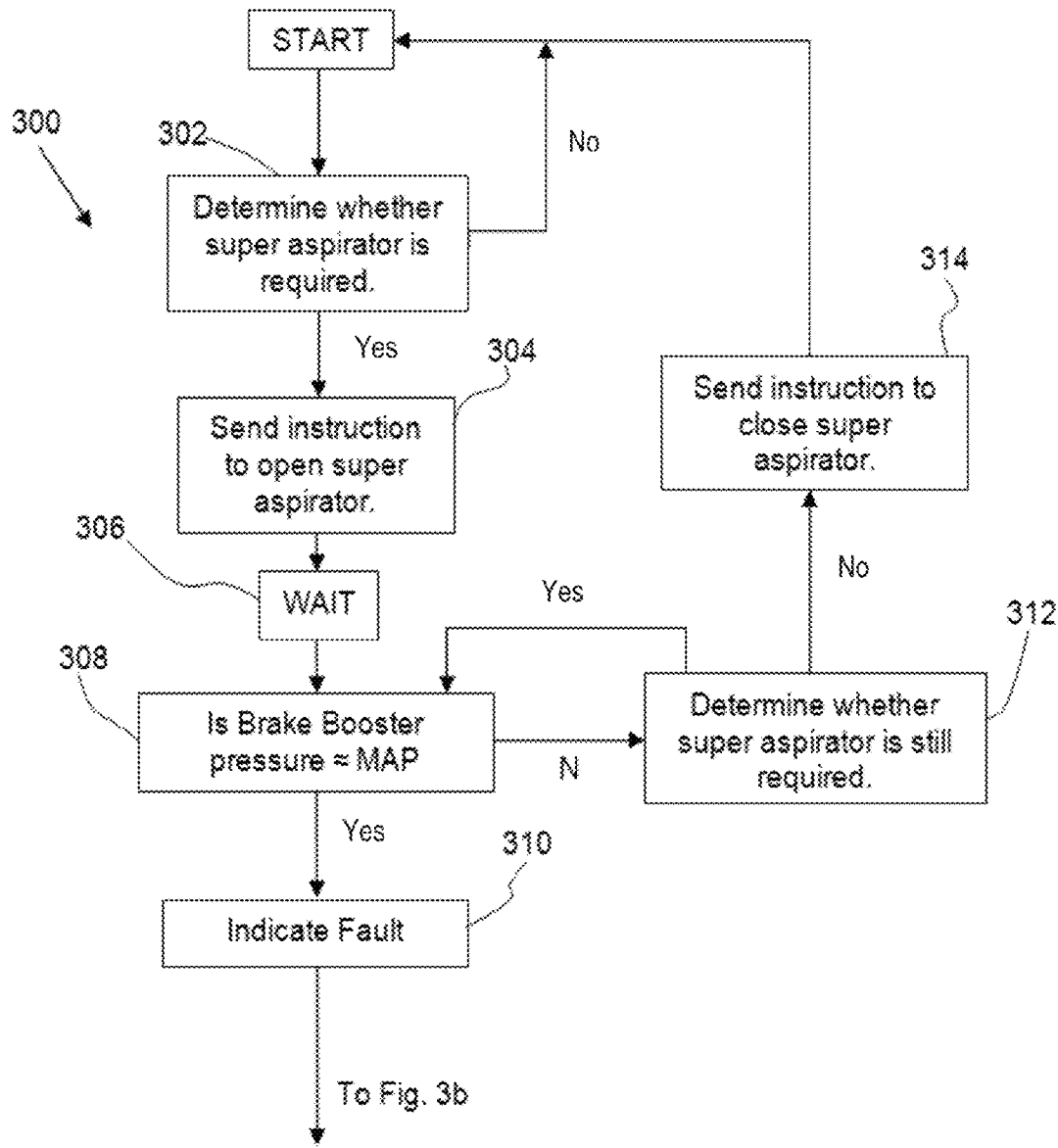
FIG. 3A shows a method for reporting a brake booster failure.
Figure 3B:
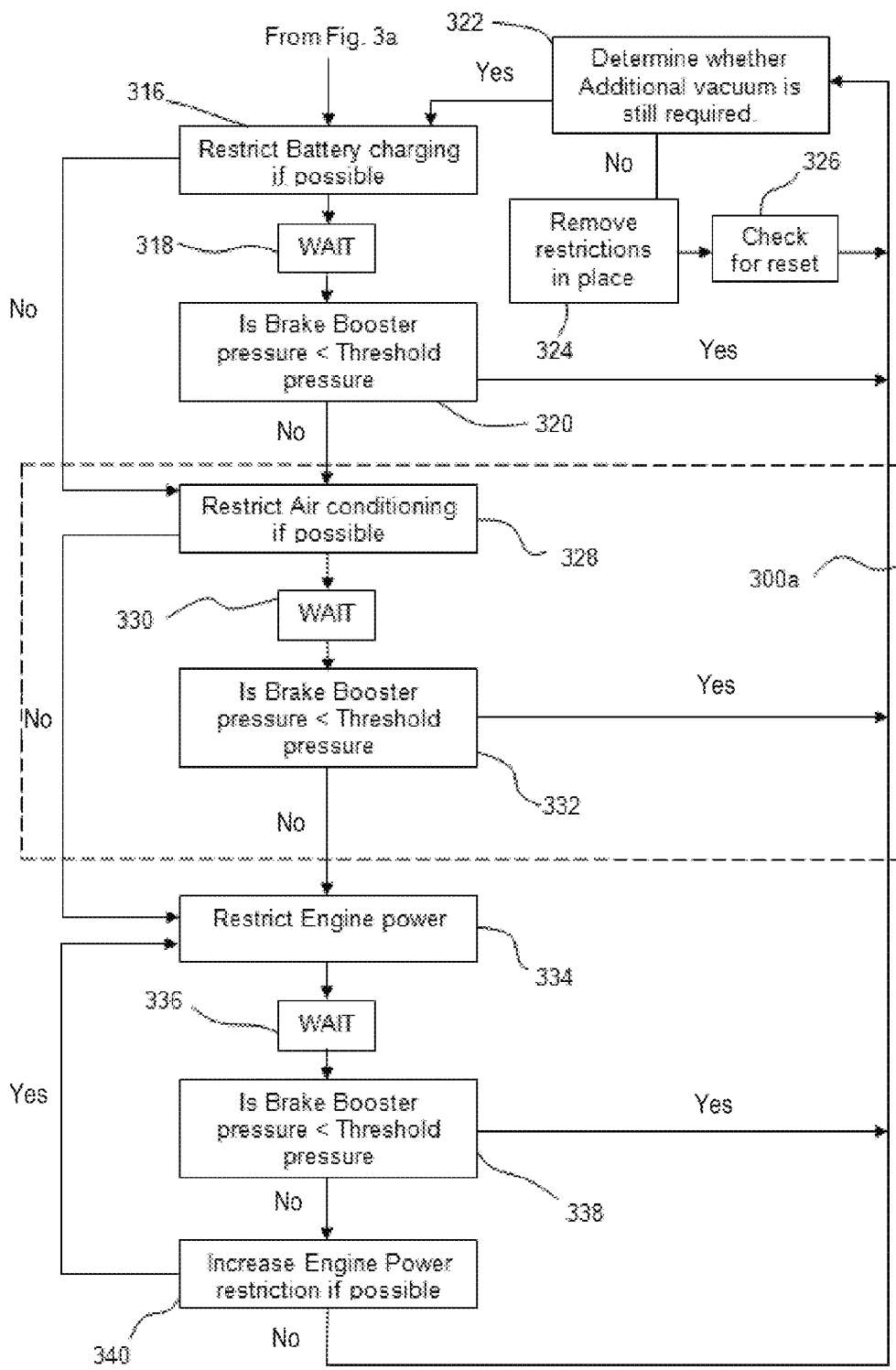
FIG. 3B expands upon a method for reporting a brake booster failure.

One exemplary method of operation for such an example embodiment as illustrated in FIGS. 1 and 2 is depicted in FIGS. 3A and 3B. Specifically, FIGS. 3A and 3B provide a flow chart illustrating the operational steps of an example method provided for reporting a brake booster failure whilst maintaining brake feel with respect to the weight of the pedal according to the present disclosure.

In one example embodiment of the present disclosure, a method for detecting a fault within a brake booster system of a vehicle may comprise measuring the pressure of a brake booster chamber and the pressure within an inlet manifold, comparing the measured brake booster chamber and inlet manifold pressures, and determining whether the secondary vacuum source is faulty.

In an additional embodiment, the method may further include restricting the use of a secondary electrical system which may draw power from the engine, restricting the power of an engine, waiting for a predetermined period of time after applying a restriction, determining whether the brake booster chamber pressure is at or below a certain threshold value before applying any additional restrictions, removing a restriction when it may no longer be required, indicating the failure or fault of a secondary vacuum source to a driver of the vehicle, or maintaining the pressure of the inlet manifold substantially at or below −30 kPa relative to atmospheric pressure, and/or any combinations thereof.

In order to provide a better understanding of the present disclosure, and to more clearly demonstrate how the example method may be carried out, the example embodiments described briefly above are further described in greater detail below with respect to the detailed descriptions of FIGS. 1-3B.

With reference to FIG. 1, a typical internal combustion engine 10 inclusive of a brake booster system is illustrated and described below. The engine 10 may further comprise a brake system 50, a brake booster system 56, and a control system 100.

The engine 10 may comprise a plurality of cylinders 12, as well as pistons 28 corresponding to respective cylinders 12. Air flow into and out of each of the provided cylinders 12 may be controlled through the use of inlet valves 14 and outlet valves 16 respectively.

Engine system 10 may further comprise an inlet duct 20 which may allow for air to be drawn into the engine 10. The inlet duct 20 may be disposed within the engine system 10 upstream of a compressor 22b and an inlet manifold 18. The engine 10 may further comprise a turbocharger 22 which may be disposed between the two walls of an inlet manifold 18 and may be arranged upstream of an inlet throttle 19. The turbocharger compressor 22a may be in direct face-sharing contact with the walls of the inlet manifold 18 and may be arranged downstream of an inlet duct 20. In some example embodiments, the turbocharger may comprise a compressor 22a which may be arranged with an exhaust gas driven turbine 22b which may drive the compressor 22a on the same shaft. In this way, the exhaust gas of the engine 10 may power the compressor 22a which may then transfer the energy obtained from the exhaust gas spinning the turbine 22b over to the compressor 22b of the turbocharger 22. The turbocharger 22 may therefore improve the engine's power output as well as the engine's emissions.

Intake air may enter the engine 10 through an inlet duct 20 and may subsequently be passed through a provided compressor 22a. Air which may have been compressed by the turbocharger compressor 22a may then be throttled by an inlet throttle 19 before being delivered to an inlet manifold 18. The inlet throttle of engine system 10 may be disposed between the walls of an inlet manifold such that the air passing from an inlet duct 20 onward into the engine 10 may be supplied at a desirable flow rate and pressure. For example, if the air compressed by the turbocharger compressor 22a may be at too high a pressure, the provided throttle 19 may only supply a portion of the compressed air to the combustion chamber.

Specifically, due to the presence of the inlet throttle 19, and also through the action of the engine pistons 28 drawing air from the inlet manifold into the engine cylinders 12, the inlet manifold 18 may exhibit a lower pressure than the air entering the engine through the inlet 20. For example, there may be a vacuum present within the inlet manifold 18 thus providing a lower pressure than that of the air entering through the inlet 20. The level of inlet manifold vacuum may be reduced as the throttle is opened, and/or the turbocharger compressor 22a may be driven by the turbocharger turbine 22b in order to boost the pressure of the inlet air.

The presence of the air in the inlet manifold 18 may be measured by a manifold air pressure (MAP) sensor 32. Inlet manifold pressure may be an input parameter for a control system 100 and may be used to determine the amount of fuel injected into the engine cylinders 12. Additionally or alternatively, the manifold pressure value may be used to determine the expected performance of any systems which may use the inlet manifold as a vacuum source.

The inlet manifold 18 may be disposed in one embodiment adjacent to the inlet valves 14. This adjacent placement may allow air within the inlet manifold 18 to be drawn into the cylinders 12 when their respective inlet valve 14 may be in an open position. In the cylinders 12, fuel may be mixed with the supplied air and may be subsequently combusted.

Mechanical power may be developed via a crankshaft 30 and may be used to drive the engine and thusly the vehicle as well as providing power to an alternator (not shown). The alternator may charge a battery for the vehicle and may power ancillary electrical systems. Such systems may include air conditioning, cabin heating, windscreen heating, a stereo system and/or any other electrical system that may commonly be found in a vehicle.

Combustion gases may then be exhausted from the cylinders 12 via an outlet valve 16 and into an exhaust manifold 24. Exhaust gases within the exhaust manifold 24 may then pass through a turbocharger turbine 22b and through an emissions control device 26 before being subsequently exhausted through an exhaust pipe.

The emission control device 26 is illustrated in FIG. 1 as arranged along an exhaust passage manifold 24 downstream of the turbocharger turbine 22b. The emission control device 26 may be a three-way catalyst (TWC), configured to reduce NOx and oxidize CO and non-combusted hydrocarbons. In some examples, the emission control device 26 may be a NOx trap, various other emission control devices, or any combination thereof.

The brake system 50 may comprise a brake pedal 54, a brake booster 56, and a brake master cylinder 59. The brake booster system 56 may be configured to amplify the force provided by a user 52, also referred to herein as a driver, on the brake pedal 54.

Amplification of the applied braking force may be achieved through the use of a negatively pressurized brake booster chamber 58 which may include a diaphragm (not shown). When the brake pedal 54 is depressed and actuated, the diaphragm may be exposed to atmospheric air on one side, whilst the other side may be exposed to the vacuum pressure within the brake booster chamber 58. This pressure difference across the diaphragm may be used to provide additional braking force to the brake master cylinder 59.

Using a brake booster to amplify the supplied braking force in this way may result in the effect of a lighter feeling brake pedal, which may result in a user not needing to push as hard on the brake pedal in order to achieve the desired level of braking.

The brake booster 56 may be connected via an air line 60 to the inlet manifold 18. The brake booster 56 may be charged with a vacuum pressure from the inlet manifold 18 via the air line 60. A check valve 62 may be included in the air line 60 in order to ensure that the flow of air is from the brake booster 56 to the inlet manifold 18 only. This may allow vacuum pressure in the brake booster chamber 58 to be maintained through conditions when the inlet manifold 18 pressure may be higher than the brake booster chamber pressure.

A brake booster pressure sensor 68 may be provided within the brake booster chamber 58 in order to determine the vacuum pressure level within the chamber.

When the turbocharger 22 may be operating and/or when an inlet throttle 19 is in an open position, the inlet manifold pressure may be too high to provide an adequate vacuum source for example. Accordingly, one or more additional vacuum sources 64 may be provided for the brake booster 56. An additional vacuum source may comprise an electrically driven vacuum pump, however, it may be equally envisioned that an additional vacuum source 64 may comprise a mechanically driven pump, a venturi device, or any other suitable pump capable of producing a vacuum. Further, the additional vacuum source may comprise one or more pumps and/or venture devices.

A control valve 66 may be provided to control the operation of a vacuum source 64. The control valve may be electronically or pneumatically controlled. The control valve 66 may generally be in an off position and may be switched on by the control system 100 when the pressure reading from a brake booster pressure sensor 68 may rise above a desirable level.

In the example embodiment provided in FIG. 1, if a fault were to occur with either the vacuum source 64 or the control valve 66, pressure in the brake booster chamber 58 may not be reduced below the pressure of the inlet manifold 18. If the inlet manifold vacuum is poor, for example, if the inlet manifold 18 pressure is not sufficiently low, the vacuum within the brake booster chamber 58 may drop below the desired level, this may potentially lead to the brake pedal 54 feeling heavy to the driver of the vehicle.

A heavy brake pedal feeling may become more noticeable to a driver of the vehicle at brake booster vacuum levels less than 30 kPa below atmospheric pressure. Due to the heavy brake pedal feeling, this type of drawback may be uncomfortable and/or undesirable to a user.

Controller 100 is shown in FIG. 1 as a conventional microcomputer including: a microprocessor unit 102, input/output ports 104, an electronic storage medium for executable programs and calibration values shown as a read-only memory 106 in this particular example, random access memory 108, keep alive memory 110, and a conventional data bus. Controller 100 is shown receiving various signals from sensors coupled to the engine 10, in addition to those signals previously discussed. The controller 100 may receive signals from the various sensors of FIG. 1 and may employ the various actuators of FIG. 1 in order to adjust engine operation based on the received signals and instructions stored on a memory of the controller.

Storage medium read-only memory 106 may be programmed with computer-readable data representing non-transitory instructions executable by a microprocessor unit 102 for performing the methods described below as well as other variants that are anticipated but may not be specifically mentioned.

In some examples, controller 100 may output an indication of system degradation or fault to a light or display panel (not shown). The indication may be a visual alert such as an illuminated light or a message. The message may include a diagnostic code that may indicate the nature of the fault condition. For example, controller 100 may indicate a fault in the brake booster system via a light or display panel of the vehicle's instrument cluster (not shown). The indication may be an alphanumeric code representing a fault in the brake booster system for example.

As described above, FIG. 1 only illustrates one cylinder of a multi-cylinder engine and each cylinder may similarly include its own set of intake and exhaust valves, fuel injector, spark plug etc.

In an example embodiment provided in FIG. 2, the engine 10 may comprise a naturally aspirated gasoline internal combustion engine. However, it may be equally envisioned that the present disclosure may apply to a diesel engine for example. Additionally or alternatively, the engine may comprise a turbocharger or a supercharger. In some embodiments, the vehicle comprising an engine system 10 may additionally comprise an additional auxiliary motor, such as an electric motor. For example, the engine 10 may be a part of a hybrid drive system.

The naturally aspirated engine 10 embodiment provided may also comprise an inlet 20, a throttle 19, and an intake manifold 18 as described above with reference to FIG. 1.

In the example embodiment illustrated in FIG. 2, an additional vacuum source 64 may comprise a super aspirator 201. The super aspirator may comprise a venture device and may further comprise an inlet side 201a, an outlet side 201b, and a narrowing area also referred to herein as a throat 201c. The inlet side 201a of the super aspirator 201 may be connected to the inlet duct 20 of the engine 10 via an inlet line 206. An outlet line 208 may further connect the outlet side 201b to the inlet manifold 18 of the engine 10.

As described above, when the engine 10 is operating, there may be a reduced pressure within the inlet manifold 18 relative to the inlet 20. Air may therefore, be drawn through the super aspirator 201 from the higher pressure inlet 20 to the lower pressure inlet manifold 18. When a flow of air may be present through the super aspirator 201, the pressure within the venture of the super aspirator may be lower than at either the inlet side 201a or the outlet side 201b.

A vacuum pipe 220 may be connected to the super aspirator 201 between the inlet end 201a and the outlet end 20 lb. The vacuum pipe may comprise a fluidic communication with the flow through the super aspirator venture. The vacuum pipe 220 may further be connected to the super aspirator 201 at a location where pressure within the venture device is lowest, for example, at the throat 201c.

The vacuum pipe 220 may also be connected (directly or indirectly) to the brake booster chamber 58. When the super aspirator is in an operational state, the brake booster chamber may thus exhibit a higher vacuum level respective to that of the inlet manifold 18. A super aspirator check valve 216 may additionally be provided between the brake booster 56 and the super aspirator 201 in order to allow the vacuum to be retained within the brake booster 56 in a case in which the super aspirator 201 may not be operating.

Operation of the super aspirator 201 may be controlled via a shut-off valve 202. The provided shut-off valve may comprise a ball valve, a butterfly valve, or any other valve capable of selectively permitting flow through the super aspirator and/or combinations thereof. Additionally, the shut-off valve may be controlled by a control system 100 via a signal line 204. The shut-off valve may be positioned at the inlet side or the outlet side of the super aspirator. Alternatively, the shut-off valve may be positioned between the inlet side and the outlet side of the super aspirator. For example, the shut-off valve may be disposed within the throat 201c. Alternatively, the shut-off valve may, in some embodiments, be positioned upstream of the super aspirator, such as on the inlet line 206, or downstream of the super aspirator, such as on the outlet line 208. The shut-off valve 202 may close in order to prevent the flow of air through the super aspirator when an additional vacuum may not be required. For example, when a sufficient level of vacuum may be available from the inlet manifold 18 and the super aspirator may not be required.

In an example embodiment wherein the additional vacuum source 64 may comprise the super aspirator 201 as shown in FIG. 2, the vacuum line 60 may still be provided in order to enable the brake booster chamber 56 to be charged with a vacuum pressure from the inlet manifold when desirable. For example, when a sufficient level of vacuum may be available from the inlet manifold 18, the brake booster chamber 56 may be charged with the vacuum pressure from the inlet manifold. If the vacuum line 60 is provided, a check valve 62 may also be provided as described above.

As depicted in FIG. 2, the brake booster 56 may further comprise a pressure sensor 68. The pressure sensor 68 may be connected to an anti-lock braking system (ABS) module 212 via a brake vacuum signal cable 218. The ABS module may be connected to the control system 100 via a data bus 214, which may comprise a controller area network (CAN) bus. Alternatively, the data bus may comprise any other suitable data bus. The control system 100 may therefore be configured to monitor the brake booster vacuum levels. In an alternative embodiment, there may be no ABS module and/or the brake vacuum signal cable 218 may be connected directly to a provided control system 100.

Instructions for carrying out a method for detecting a fault within a brake booster system of a vehicle and the rest of the methods included herein may be executed by a controller based on instructions stored on a memory of the controller and in conjunction with signals received from sensors of the engine system, such as the sensors described above with reference to FIG. 1. The controller may employ engine actuators of the engine system to adjust engine operation, according to the methods described below.

With reference to FIG. 3A, the control system 100 may perform a control and monitoring process 300. The process 300 may be performed by a single controller, or alternatively, the process 300 may be performed by more than one controller or module, each of which may perform part of the process 300.

Once the process 300 is initiated, in step 302, the system may determine whether the super aspirator 201 is required or not. For example, the system may compare the pressure of the brake booster chamber 58 to a desired pressure that may be predetermined to provide an optimal feel and pressure of the brakes. If the system determines that the super aspirator may not be required, the process may then return to the start of the process sequence. The process 300 may therefore continue to monitor the requirements necessary for the super aspirator 201.

If in step 302, the system determines that the super aspirator is required, for example, the process may then proceed to step 304 in which the super aspirator may then be instructed to initiate operation. For example, in instructing the super aspirator to initiate operation, a shut-off valve 202 of the super aspirator 201 may then be instructed to open. For example, adjusting a shut-off valve 202 may include adjusting an actuator of the super aspirator in order to adjust and actuate the shut-off valve 202 and move said valve into an open or closed position.

At a point when the super aspirator 201 may be instructed to turn on an initiate operation, the brake booster pressure may be substantially similar or the same as the inlet manifold 18 pressure since the inlet manifold pressure may have previously been acting as the vacuum source for the brake booster. Once the super aspirator 201 may be instructed to initiate operation, the pressure of the brake booster chamber may be expected to reduce relative to the inlet manifold pressure. In step 306, the process may wait for a predetermined period of time in order to allow the super aspirator to begin lowering the brake booster pressure prior to proceeding onward to step 308.

In step 308 of the example method, the process may compare the inlet manifold pressure with the brake booster pressure. Since the super aspirator may have been instructed to operate for a specific period of time in step 306, the brake booster pressure may be substantially similar or the same as the inlet manifold pressure, or if the absolute pressure may not be below a certain threshold, it may be determined that the super aspirator or super aspirator shut-off valve may be faulty. In such a case, the process described herein with respect to FIGS. 3A-3B may then proceed to step 310 wherein the super aspirator fault may be indicated to the user.

If in step 308 of the described method, the brake booster pressure may not be substantially similar or equal to the inlet manifold pressure, it may be determined that the super aspirator may be operating without a fault and the process may then loop between steps 312 and 308 in order to monitor the operation of the super aspirator whilst it may still be required. Once it may be determined in step 312 that the super aspirator may no longer be required, the process may then proceed onto step 314 in which the super aspirator may be instructed to switch off. Specifically, the shut-off valve 202 may be instructed to close via a controller 100 and the process may then return to a starting block.

With reference to FIG. 3B, if a fault may have been detected within the operation of the super aspirator, and the fault has been indicated to the driver in step 310, the process 300 may then begin to restrict the use of ancillary systems, such as one or more electrical systems, and may thereby reduce the load on the engine 10. The restricting may be by adjusting operation of an actuator, such as a switch, that enables said systems to disable the systems when use is restricted. In this way, reducing the load on the engine may allow for increased throttling of the inlet air by the throttle 19, which may reduce the pressure within the inlet manifold 18. In step 316, the process may act in a way that may restrict a first ancillary system of the vehicle, for example, a battery charger, if the restriction of such a system is possible. The restriction may not be possible, for example, if the controller 100 deems the ancillary system to be essential to the functioning of the engine 10 and/or the vehicle at that particular point in time, such as if the batter level may be below a certain threshold and may require charging. The process may then wait in step 318 in order to allow the inlet manifold pressure to be lowered due to a reduced load on the engine 10.

After waiting in step 318, the process may then proceed on to step 320 where the brake booster pressure may be compared to a predetermined threshold pressure. The threshold pressure may be set at a desired level such that the pressure may maintain a soft feel of the brake pedal to a driver. If the brake booster pressure may be below the threshold pressure value, such as when there may be sufficient vacuum within the brake booster chamber, the process may then proceed to step 322.

In step 322, the system may consider whether it may be necessary to maintain an additional vacuum, specifically, to continue to provide vacuum pressure to the brake booster. This may be desirable, for example, when the vehicle may be braking, or may be expected to brake. If additional vacuum may still be required, the process may then return to step 316 and the system may then continue to restrict ancillary systems. If in step 322, the system determines that an additional vacuum may no longer be required, in step 324, the system may then remove any restrictions which may have previously been imposed and the method may then proceed to step 326 where the system may check whether or not the restriction has been reset, such as if a vehicle has been taken into a garage and may have been repaired. The system may continue to loop between steps 322 and 326, such that if the necessity to supply additional vacuum from the inlet manifold arises once again, the process may be able to return to step 316 in order to restrict the use of ancillary systems.

If in step 316, the system determines that it may not be possible to restrict battery charging for example, if the battery is not currently being charged, the process may then proceed to step 328 in which an alternative system, for example, an air conditioning system of the vehicle may be restricted. Similarly, if in step 320, the system determines that the restriction on the battery charging may not have reduced the brake booster pressure sufficiently, the system may then proceed to step 328 in order to restrict the alternative system in addition to the restrictions already implemented by the system.

If in step 332, the system determines that the brake pressure may now be below the threshold pressure, the system may then proceed to step 322 as described above. Alternatively, if the brake booster pressure remains at a pressure that is determined to be too high, the system may then proceed to restrict the next system. Similarly, if the system determines in step 328 that the second ancillary system may not be restricted, the system may then proceed to restrict the next ancillary system.

In the example method embodiment provided in FIG. 3B, once a second ancillary electrical system is effectively restricted, the system may then proceed to step 334 in which the power of the engine may be directly restricted. However, it may be equally envisioned that additional ancillary systems may be restricted prior to the system beginning to restrict engine power. It will be appreciated that a part 300*a* of the process described herein may be repeated as desired and another system may be restricted, for example, a stereo system of the vehicle, heated seats, heated windscreen, and/or tailgate glass, and/or any other system which may draw power from the engine directly or indirectly. The systems may be restricted in order of preference such as restricting the least essential system first and proceeding to restrict systems of similar priority for example.

Once all desired ancillary systems are restricted according to one embodiment of the method, the process may then proceed to step 334 as depicted in FIG. 3B. In step 334 the power of the engine may be directly restricted. For example, the throttle of the engine may be at least partially closed. This may result in the effect of reducing the driving performance of the vehicle. Similar to the restrictions described above, the system may wait for a predetermined period of time in step 336 before comparing the brake booster pressure with a threshold value in step 338. If the brake booster pressure falls below the threshold value, the system may proceed on to step 322 as described above. Alternatively, if the brake booster pressure remains above the threshold value, the system may then consider, in step 340, whether it may be possible and/or desirable to restrict engine power further. If the system determines that the engine power may be restricted further, the system may then return to step 334 in order to implement the additional restriction. If further restriction of the engine power may be determined to be not possible and/or if restriction of the engine power may not be desirable in step 340, it may not be possible to lower the inlet manifold pressure any further. The system may then return to step 322 in order to continue monitoring whether or not the additional vacuum may still be required.

As described above, in step 326, the system may await a reset instruction. For example, the vehicle may be taken to a garage where the super aspirator and/or shut-off valve may be replaced or fixed and the system may be manually reset. Additionally or alternatively, after a certain specified interval of engine running time, and/or engine or vehicle mileage, and/or engine revolutions, the control system may automatically reset and return to the start of the process 300 in order to determine whether the fault may still persist.

In the process 300, described above, by restricting the use of electrical systems prior to limiting the mechanical power of the engine, the control system 100 of the vehicle may not necessarily affect the handling or performance of the vehicle until other options for preventing a hard or heavy feeling brake pedal may be attempted. In other words, the engine may be the last system to be restricted.

In addition to performing the process 300 during normal operation of the super aspirator, the control system 100 may test the super aspirator as a precaution, for instance, in order to ensure that the super aspirator may be able to operate when required. For example, the control system may deliberately proceed to step 304 in the process even though the super aspirator may not be required. The system may therefore detect any fault present with the super aspirator or, if there may be no fault detected, the process may then proceed as normal in order to close the super aspirator and to return to the start of the process 300. If a fault may be detected during such a precautionary test, the system may then indicate the fault to the driver, however, no restrictions of ancillary systems or engine power may then be enacted at that particular point of the process.

It will be appreciated that when the system determines that the super aspirator 201 may be faulty; the system may additionally or alternatively, be the shut-off valve 202 for the super aspirator which may be faulty. In the context of this disclosure, a fault within the super aspirator or any vacuum source may be considered to also comprise any fault within a control valve of the vacuum source.

Although the process 300 may be described herein assuming that only a super aspirator may be used to provide vacuum pressure to the brake booster chamber, it may be equally envisioned that a mechanically or electronically driven pump may be used, and/or any other pump suitable of providing a vacuum which may be controlled by an electronic controller. A combination of vacuum sources may also be used. The above described methods and systems may therefore be applied to such alternative vacuum sources.

It will be appreciated by those skilled in the art that although the invention may be described herein by way of example, with reference to one or more examples, the disclosure is not limited to the disclosed example embodiments and that alternative and/or additional example embodiments may be constructed without departing from the scope of the invention as defined by the claims.

FIG. 1 shows an example configuration with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example.

In this way, it may be possible to diagnose a faulty super aspirator and/or a faulty shut-off valve by measuring a difference between inlet manifold pressure and a brake booster vacuum. In the case of a super aspirator assembly experiencing or developing a fault, the system may then be able to enact protective and precautionary measures to ensure a sufficient vacuum within the inlet manifold by reducing auxiliary engine loads such as an air conditioning system and/or other electrical loads or by directly limiting the power and/or torque output of the engine.

An example technical effect of providing a system and method for detecting a fault within a brake booster system and providing an additional vacuum source is that, in the case of a first vacuum source or super aspirator electronic shut-off valve failure, sufficient vacuum pressure from a first vacuum source may not be available within the brake booster chamber. In this case, a secondary vacuum source in the form of a super aspirator in some embodiments may provide sufficient vacuum pressure such that a brake pedal of a vehicle does not begin to feel heavy or difficult to depress. In this way, the comfort and ease of use of a vehicle's brake system may be maintained or improved.

As one embodiment according to an aspect of the present disclosure, a method for detecting a fault within a brake booster system of a vehicle, the vehicle comprising an inlet manifold for an engine, the inlet manifold for an engine, the inlet manifold providing a first source of vacuum for the brake booster system, the vehicle further comprising a second source of vacuum for the brake booster system, wherein the manifold comprises, measuring the pressure of a brake booster chamber and the pressure in the inlet manifold when a secondary vacuum source is instructed to be active, comparing the measured brake booster chamber and inlet manifold pressures, determining whether the secondary vacuum source is faulty, and restricting the use of a first electrical system which draws power from the engine in the case of a fault so as to reduce and/or maintain the pressure of the inlet manifold. In a first example of the method, determining whether the secondary vacuum source is faulty comprises, determining if the measured brake booster chamber pressure is substantially equal to the measured inlet manifold pressure. A second example of the method may optionally include the first example and further comprises restricting the use of a second electrical system which draws power from the engine. A third example of the method may optionally include one or more of the first and second examples and further comprises restricting the power of the engine. A fourth example of the method may optionally include one or more of the first through third examples and further comprises waiting for a predetermined period after applying a restriction, and determining whether the brake booster chamber pressure is at or below a threshold value before applying any further restrictions. A fifth example of the method may optionally include one or more of the first through fourth examples and further comprises removing a restriction when it is no longer required. A sixth example of the method may optionally include one or more of the first through fifth examples and further includes, the first electrical system comprises an air-conditioning system for the vehicle or a battery charging system for a vehicle. A seventh example of the method may optionally include one or more of the first through sixth examples and further includes, the second electrical system comprises an air-conditioning system for the vehicle or a battery charging system for the vehicle. An eighth example of the method optionally includes one or more of the first through seventh examples and further comprises indicating a fault of the secondary vacuum source to a driver of the vehicle. A ninth example of the method optionally includes one or more of the first through eighth examples and further comprises, maintaining the pressure of the inlet manifold substantially at or below −30 kPa relative to atmospheric pressure. A tenth example of the method optionally includes one or more of the first through ninth examples and further includes, the secondary vacuum source comprises a super aspirator.

As another embodiment, a system for detecting a fault within a brake booster system of a vehicle, the vehicle comprising an inlet manifold for an engine, the inlet manifold providing a first source of vacuum for the brake booster system, the vehicle further comprising a second source of vacuum for the brake booster system, wherein the system comprises one or more controllers configured to carry out a method for detecting a fault within a brake booster system of a vehicle, wherein the method comprises, measuring the pressure of a brake booster chamber and the pressure in the inlet manifold when the secondary vacuum source is instructed to be active, comparing the measured brake booster chamber and inlet manifold pressures, determining whether the secondary vacuum source is faulty, and restricting the use of a first electrical system which draws power from the engine in the case of a fault so as to reduce and/or maintain the pressure of the inlet manifold. In a first example of the system, the system is further configured to restrict the use of a second electrical system which draws power from the engine. A second example of the system optionally includes the first example, and additionally includes, the system further configured to restrict the power of the engine. A third example of the system optionally includes one or more of the first and second examples and comprises, the system further configured to remove a restriction when the restriction is no longer required. A fourth example of the system optionally includes one or more of the first through third examples and comprises the system further configured to indicate a fault of the secondary vacuum source to a driver of the vehicle. A fifth example of the system optionally includes one or more of the first through fourth examples and comprises, the system further configured to maintain the pressure of the inlet manifold substantially at or below −30 kPa relative to atmospheric pressure.

Note that the example control and estimation routines included herein may be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for detecting a fault within a brake booster system of a vehicle, the vehicle comprising an inlet manifold for an engine, the inlet manifold providing a first source of vacuum for the brake booster system, the vehicle further comprising a second source of vacuum for the brake booster system, wherein the method comprises:
providing a first connection between a brake booster chamber and the inlet manifold through a first check valve;
providing a second connection between the brake booster chamber and an aspirator of the second source of vacuum through a second check valve, the second check valve being parallel to the first check valve;
activating a shut-off valve at an outlet side of the aspirator, directing air from the brake booster chamber through the second check valve to the inlet manifold;
measuring a pressure of the brake booster chamber and a pressure in the inlet manifold when the shut-off valve of the second source of vacuum is instructed to be active;
comparing the measured brake booster chamber and inlet manifold pressures;
determining whether the second source of vacuum is faulty;
indicating a fault of the second source of vacuum to a driver of the vehicle; and
restricting use of a first electrical system which draws power from the engine in case of the fault so as to reduce and/or maintain the pressure of the inlet manifold.

2. The method of claim 1, wherein determining whether the second source of vacuum is faulty comprises:
determining if the measured brake booster chamber pressure is substantially equal to the measured inlet manifold pressure, the brake booster chamber pressure relayed through an anti-lock braking module to a controller.

3. The method of claim 1, wherein the method further comprises:
restricting use of a second electrical system which draws power from the engine.

4. The method of claim 1, wherein the method further comprises:
restricting the power of the engine.

5. The method of claim 4, wherein the method further comprises:
waiting for a predetermined period after applying a restriction; and
determining whether the brake booster chamber pressure is at or below a threshold value before applying any further restrictions.

6. The method of claim 4, wherein the method further comprises removing a restriction when the restriction is no longer required.

7. The method of claim 1, wherein the first electrical system comprises an air-conditioning system for the vehicle or a battery charging system for the vehicle.

8. The method of claim 3, wherein the second electrical system comprises an air-conditioning system for the vehicle or a battery charging system for the vehicle.

9. The method of claim 1, wherein the pressure of the inlet manifold is maintained substantially at or below −30 kPa relative to atmospheric pressure.

10. A system for detecting a fault within a brake booster system of a vehicle, the vehicle comprising an inlet manifold for an engine, the inlet manifold providing a first source of vacuum for the brake booster system, the vehicle further comprising a second source of vacuum for the brake booster system, wherein the system comprises one or more controllers configured to carry out a method for detecting a fault within the brake booster system of the vehicle, wherein the method comprises:
providing a first connection between a brake booster chamber and the inlet manifold through a first check valve;
providing a second connection between the brake booster chamber and an aspirator of the second source of vacuum through a second check valve, the second check valve being parallel to the first check valve;
activating a shut-off valve at an outlet side of the aspirator of the second source of vacuum, directing air from the brake booster chamber through the second check valve to the inlet manifold;

measuring a pressure of the brake booster chamber and a pressure in the inlet manifold when the second source of vacuum is instructed to be active;

comparing the measured brake booster chamber and inlet manifold pressures;

determining whether the second source of vacuum is faulty;

indicating a fault of the second source of vacuum to a driver of the vehicle; and restricting use of a first electrical system which draws power from the engine in case of the fault so as to reduce and/or maintain the pressure of the inlet manifold.

11. The system of claim 10, wherein the system is further configured to restrict use of a second electrical system which draws power from the engine.

12. The system of claim 10, wherein the system is further configured to restrict the power of the engine.

13. The system of claim 10, wherein the system is further configured to remove a restriction when the restriction is no longer required.

14. The system of claim 10, wherein the system is further configured to maintain the pressure of the inlet manifold substantially at or below −30 kPa relative to atmospheric pressure.

15. A method, comprising:

providing a first connection between a brake booster chamber and an inlet manifold of a vehicle through a first check valve;

providing a second connection between the brake booster chamber and an aspirator of a secondary vacuum source through a second check valve, the second check valve being parallel to the first check valve;

instructing the secondary vacuum source to activate by actuating an actuator coupled to a shut-off valve on an outlet side of the aspirator for fluidically coupling the brake booster chamber to the inlet manifold through the second check valve, and while actuated measuring a pressure of the brake booster chamber and a pressure in the inlet manifold; and restricting use of a first electrical system drawing power from an engine responsive to a degradation of the secondary vacuum source determined by comparing the measured brake booster chamber and inlet manifold pressures, the degradation relayed through a signal to a driver of the vehicle.

16. The method of claim 15, wherein restricting use includes adjusting operation of an electric switch coupled in the first electrical system via a controller.

\* \* \* \* \*